United States Patent
Wiklof

(10) Patent No.: US 11,189,321 B2
(45) Date of Patent: Nov. 30, 2021

(54) RETROSPECTIVE CAPTURE TRIGGER

(71) Applicant: DOS CENTAVOS, LLC, Everett, WA (US)

(72) Inventor: Christopher A. Wiklof, Everett, WA (US)

(73) Assignee: DOS CENTAVOS, LLC, Everett, WA (US)

( * ) Notice: Subject to any disclaimer, the term of this patent is extended or adjusted under 35 U.S.C. 154(b) by 0 days.

(21) Appl. No.: 16/821,423

(22) Filed: Mar. 17, 2020

(65) Prior Publication Data

US 2020/0286526 A1 Sep. 10, 2020

Related U.S. Application Data

(63) Continuation of application No. PCT/US2018/053805, filed on Oct. 1, 2018, and a
(Continued)

(51) Int. Cl.
*H04N 5/77* (2006.01)
*G11B 27/30* (2006.01)
(Continued)

(52) U.S. Cl.
CPC ............ *G11B 27/309* (2013.01); *G06F 3/016* (2013.01); *G10L 15/08* (2013.01); *G10L 15/22* (2013.01); *G10L 25/51* (2013.01); *G11B 27/34* (2013.01); *G11B 33/025* (2013.01); *H04N 5/232* (2013.01); *H04N 5/765* (2013.01); *H04N 5/77* (2013.01);
(Continued)

(58) Field of Classification Search
None
See application file for complete search history.

(56) References Cited

U.S. PATENT DOCUMENTS 8,942,533 B2 1/2015 Wiklof
2011/0289413 A1 11/2011 Ubillos et al.
(Continued)

FOREIGN PATENT DOCUMENTS

JP 2016-208516 12/2016
KR 101427718 8/2014
(Continued)

OTHER PUBLICATIONS

PCT International Search Report and Written Opinion dated Jan. 30, 2019, for PCT International Patent Application No. PCT/US2018/053805 filed on Oct. 1, 2018, 13 pages.
(Continued)

*Primary Examiner* — Eileen M Adams
(74) *Attorney, Agent, or Firm* — Christopher A. Wiklof; Launchpad IP, Inc.

(57) ABSTRACT

An event marking device marks the real time at which notable events occur. When a notable event occurs, a user causes the event marking device to generate a trigger signal. The event marking device includes a real-time clock. When the user causes a trigger signal to be generated, a microcontroller of the event marking device reads the real-time clock and writes trigger event data to a memory indicating a real time at which the trigger signal was generated. The event marking device outputs the trigger event data to an external device.

18 Claims, 7 Drawing Sheets

Related U.S. Application Data continuation of application No. PCT/US2018/053807, filed on Oct. 1, 2018.

(60) Provisional application No. 62/567,054, filed on Oct. 2, 2017, provisional application No. 62/572,157, filed on Oct. 13, 2017.

(51) Int. Cl.

| | | |
|---|---|---|
| *H04N 5/765* | (2006.01) | |
| *G06F 3/01* | (2006.01) | |
| *G10L 15/08* | (2006.01) | |
| *G10L 15/22* | (2006.01) | |
| *G10L 25/51* | (2013.01) | |
| *G11B 27/34* | (2006.01) | |
| *G11B 33/02* | (2006.01) | |
| *H04N 5/232* | (2006.01) | |
| *H04N 5/91* | (2006.01) | |
| *H04L 29/06* | (2006.01) | |

(52) U.S. Cl.
CPC ......... *H04N 5/91* (2013.01); *G10L 2015/088* (2013.01); *G10L 2015/223* (2013.01); *H04L 67/42* (2013.01)

(56) References Cited

U.S. PATENT DOCUMENTS

| | | |
|---|---|---|
| 2012/0137255 A1 | 5/2012 | Folchi et al. |
| 2015/0168979 A1* | 6/2015 | Fazel ................. G05F 1/563 |
| | | 700/297 |
| 2015/0177949 A1 | 6/2015 | Ubillos |
| 2016/0110877 A1 | 4/2016 | Schwartz et al. |
| 2016/0173959 A1 | 6/2016 | Seema et al. |
| 2016/0261915 A1 | 9/2016 | Niebres et al. |
| 2016/0316176 A1* | 10/2016 | Laska ................ H04N 5/23261 |
| 2017/0262697 A1 | 9/2017 | Kaps et al. |
| 2017/0336926 A1* | 11/2017 | Chaudhri ................ H04L 51/22 |

FOREIGN PATENT DOCUMENTS

| | | |
|---|---|---|
| KR | 1020150022601 | 3/2015 |
| KR | 1020150112113 | 10/2015 |
| KR | 101656241 | 9/2016 |

OTHER PUBLICATIONS

PCT International Search Report and Written Opinion dated Feb. 12, 2019, for PCT International Patent Application No. PCT/US2018/053807 filed on Oct. 1, 2018, 21 pages.

\* cited by examiner

RETROSPECTIVE CAPTURE TRIGGER

CROSS REFERENCE TO RELATED APPLICATIONS

The present application is a Continuation Application which claims priority benefit under 35 U.S.C. § 120 of co-pending International Patent Application No. PCT/US2018/053805, entitled "RETROSPECTIVE CAPTURE TRIGGER," filed Oct. 1, 2018. International Patent Application No. PCT/US2018/053805 claims priority benefit from U.S. Provisional Patent Application No. 62/567,054, entitled "RETROSPECTIVE CAPTURE TRIGGER," filed Oct. 2, 2017. International Patent Application No. PCT/US2018/053805 also claims priority benefit from U.S. Provisional Patent Application No. 62/572,157, entitled "METHOD AND APPARATUS FOR EDITING MEDIA CONTENT," filed Oct. 13, 2017.

The present application is a Continuation Application which claims priority benefit under 35 U.S.C. § 120 of co-pending International Patent Application No. PCT/US2018/053807, entitled "METHOD AND APPARATUS FOR EDITING MEDIA CONTENT," filed Oct. 1, 2018. International Patent Application No. PCT/US2018/053807 claims priority benefit from U.S. Provisional Patent Application No. 62/572,157, entitled "METHOD AND APPARATUS FOR EDITING MEDIA CONTENT," filed Oct. 13, 2017. International Patent Application No. PCT/US2018/053807 also claims priority benefit from U.S. Provisional Patent Application No. 62/567,054, entitled "RETROSPECTIVE CAPTURE TRIGGER," filed Oct. 2, 2017.

Each of the foregoing applications, to the extent not inconsistent with the disclosure herein, is incorporated by reference.

SUMMARY

According to an embodiment, an event marking device includes a housing, a microcontroller disposed in the housing, and a memory disposed in the housing. The event marking device may include a real-time clock disposed in the housing. The event marking device also includes a trigger circuit disposed in the housing, and a communication interface disposed in the housing. The memory, the optional real-time clock, the trigger circuit, and the communication interface are operatively coupled to the microcontroller. The microcontroller is configured to read the real-time clock and to write a corresponding real-time datum in the memory upon receiving each instance of a user enabling the trigger circuit. The real time clock may be disposed in the housing or may be disposed in an external device to which the communication interface is operatively coupled. The memory to which the real-time datum is written may similarly be disposed in the housing or may be disposed in the external device to which the communication interface is operatively coupled. The microcontroller is configured to read each real-time datum from the memory and output each real-time datum via the communication interface when the communication interface is operatively couple to an external device.

According to an embodiment, a method includes generating real-time clock data with a real-time clock of an event marking device; generating, with a trigger circuit of the event marking device, a trigger signal; and identifying, from the real-time clock data with a microcontroller of the event marking device, a real time corresponding to a receipt of the trigger signal. The method includes writing, with the microcontroller, trigger event data to a memory of the event marking device indicating the real time associated with receipt of the trigger signal and outputting, with a communication interface of the event marking device, the trigger event data to an external device.

According to an embodiment, an event marking device includes a housing, a trigger circuit disposed in the housing and configured to generate a trigger signal, and a real-time clock disposed in the housing and configured to generate real-time clock data corresponding to a real time. The event marking device includes a memory disposed in the housing and configured to store marked event data in a non-transitory computer readable medium. The computer readable medium may include the memory disposed in the housing, or alternatively the marked event data may be stored in the memory of an external device. The event marking device includes a microcontroller coupled to the trigger circuit, the real-time clock, and the memory configured to receive the trigger signal, to reference the real-time clock data upon receiving the trigger signal, and to write trigger event data to the memory indicating a real time at which the trigger signal was generated. The event marking device includes a communication interface configured to output the trigger event data to an external device.

DETAILED DESCRIPTION

Figure 1:
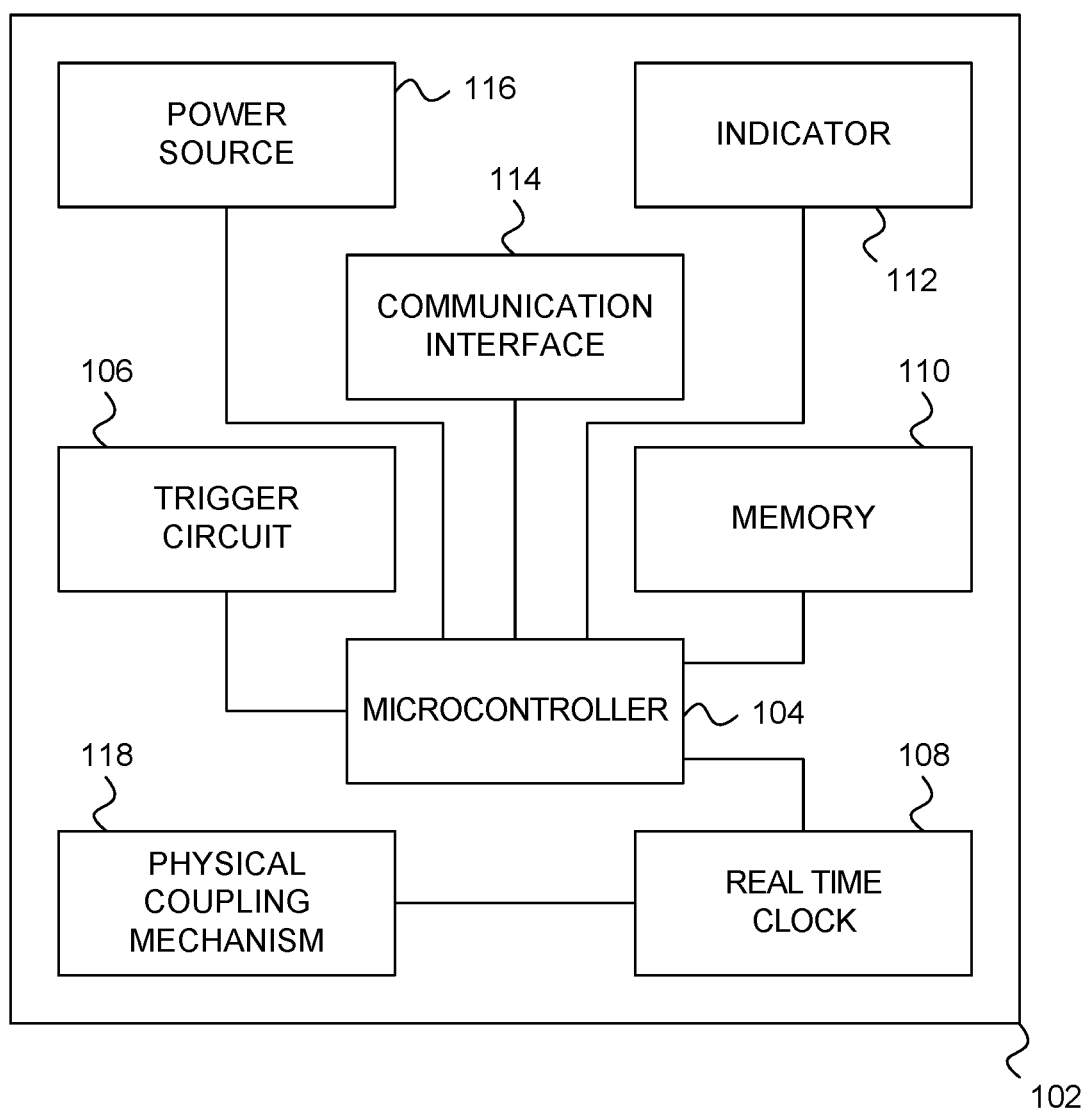
FIG. 1 is a block diagram of an event marking device, according to an embodiment.

In the following detailed description, reference is made to the accompanying drawings, which form a part hereof. In the drawings, similar symbols typically identify similar components, unless context dictates otherwise. Other embodiments may be used and/or other changes may be made without departing from the spirit or scope of the disclosure.

FIG. 1 is a diagram of an event marking device 102, according to an embodiment. According to an embodiment, the event marking device 102 assists an individual to conveniently mark a time of occurrence of notable events. By marking the time of occurrence of notable events, users may subsequently access recordings of the notable events without the need for searching through voluminous recordings.

In many scenarios, individuals may wish to identify or record media, related to the occurrence of notable events. For example, individuals often carry media capture devices, such as cameras capable of capturing media including individual images, video, and/or audio. Oftentimes, an individual may carry a camera on his person or mount the camera on a piece of equipment and set the camera to record a video stream while the individual participates in an activity. While the camera is recording the video stream, on occasion, a particularly noteworthy event may occur, such as an outstanding athletic achievement, a humorous event or comment, a rare occurrence, a crime, or another kind of noteworthy event. The camera may record hours of media both before and after the noteworthy event. Individuals may subsequently wish to retrieve from the captured media only those noteworthy events that occurred. However, it may be tedious and time-consuming to peruse the entirety of the captured media in order to identify noteworthy events that may have occurred. According to an embodiment, the event marking device 102 marks the time of occurrence of a notable event so that a user may easily retrieve recorded images, video, or audio related to the notable events, or so that a media capture device may retrospectively capture media. When the user utilizes the event marking device 102, the user may quickly and easily identify the relevant or desired portions of captured media, or may cause a media capture device to retrospectively capture media.

According to an embodiment, the event marking device 102 includes a microcontroller 104, a trigger circuit 106, a real-time clock 108, a memory 110, indicators 112, a communication interface 114, and a power source 116. The event marking device may include a housing. The housing may include a housing of a smart watch. In another embodiment, the housing includes a housing of a smart phone. In another embodiment, the housing is a housing for containing a purpose-built circuit separate from a smart watch or smart phone.

The components of the event marking device 102 cooperate to provide efficient and convenient real-time marking of notable events.

According to an embodiment, the real-time clock 108 continuously tracks the real-time. The real-time clock 108 may track the real-time in a time zone in which the event marking device 102 is currently located. Additionally or alternatively, the real-time clock 108 may track the real-time in accordance with a reference time zone, such as Greenwich standard time. The real-time clock 108 may track the time in a standard A.M./P.M. format. The real-time clock 108 may track the time in a 24-hour format. The real-time clock 108 may include an oscillator circuit, gears, a radio for receiving real-time clock data from an external source, such as an external clock, or other mechanisms for generating or receiving real-time clock data.

According to an embodiment, the trigger circuit 106 includes a mechanism for generating a trigger signal upon the occurrence of a notable event. The trigger circuit 106 may generate the trigger signal upon receiving trigger input from a user. In an embodiment, the trigger circuit 106 includes an object displayed by a graphical user interface on an electronic display forming a portion of a smart watch. In an embodiment, the trigger circuit 106 includes an object displayed by a graphical user interface on an electronic display forming a portion of the smart phone. In an embodiment, the trigger circuit 106 includes a physical button.

According to an embodiment, the memory 110 stores data related to the functionality of the handheld event marking device 102. The memory 110 may include software instructions by which the various functionalities of the handheld event marking device 102 can be implemented. The memory 110 may include one or more of EEPROMs, flash memory, ROMs, SRAM, DRAM, or other kinds of computer readable media capable of storing instructions that can be executed by the microcontroller 104.

According to an embodiment, the microcontroller 104 cooperates with the trigger circuit 106, the real-time clock 108, and the memory 110 in order to mark the occurrence of notable events. According to an embodiment, when the trigger circuit 106 generates a trigger signal, the microcontroller 104 receives the trigger signal from the trigger circuit 106. When the microcontroller 104 receives the trigger signal from the trigger circuit 106, the microcontroller 104 reads the real time from the real-time clock 108 in order to identify the real time at which the trigger signal was received from the trigger circuit 106. The microcontroller 104 then writes trigger event data to the memory 110. The trigger event data indicates the real time at which the trigger signal was received from the trigger circuit 106. The trigger event data may include the real time read by the microcontroller 104 upon receiving the trigger signal from the trigger circuit 106, a notation indicating that the real time corresponds to receipt of a trigger signal, a notation indicating the relationship of the real-time event to other real-time events stored in the memory 110, an indication of how many trigger signals were received prior to the receipt of the current trigger signal, an indication as to whether the trigger signal was generated in response to user action, an indication as to whether the trigger signal was generated automatically by the trigger circuit 106 without specific input from the user, or other types of indications or notifications pertinent to the marking of notable events.

According to an embodiment, the indicators 112 include one or more mechanisms or components for providing indications to a user of the event marking device 102. The indicators 112 inform the user regarding operations of the event marking device 102. The indicators 112 may inform the user that the trigger signal has been generated. The indicators 112 may indicate that the event marking device 102 awaits input from the user. The indicators 112 may indicate that the event marking device 102 is currently powered on. The indicators 112 may indicate that the event marking device 102 is in an operational state and is ready to generate trigger signals based on input from the user or to generate trigger signals automatically based on other determinations or stimuli. The indicators 112 may indicate that the event marking device 102 is in a low-power state. The indicators 112 may provide other kinds of indications to the user than those described herein.

In an embodiment, the indicator(s) 112 includes one or more objects displayed by a graphical user interface on an electronic display forming a portion of a smart watch. In an embodiment, the indicator(s) 112 includes one or more objects displayed by a graphical user interface on an electronic display forming a portion of the smart phone.

According to an embodiment, the communication interface 114 enables the event marking device 102 to communicate, under control of the microcontroller 114, with external devices. The communication interface 114 may output trigger event data from the memory 110 to an external device. The microcontroller 104 reads the trigger event data from the memory 110 indicating the real times at which trigger signals were received from the trigger circuit 106. The microcontroller 104 controls the communication interface 114 to output the trigger event data to the external device. The external device and/or the user may utilize the trigger event data to advantageously identify the times at which notable events occurred or to retrospectively capture media related to the occurrence of notable events.

According to an embodiment, the power source 116 provides power to the various components of the event marking device 102. The power source 116 may include a battery. According to an embodiment, the battery provides power to the event marking device 102. The battery may include a rechargeable battery that enables the user to recharge the battery after the battery has become depleted through use. The battery may be a lithium-ion battery, a NiCad battery, a carbon zinc battery, an alkaline battery, a nickel metal hydride battery, or other types of batteries. The power source 116 may also include a wired power supply that receives power from a source external to the event marking device 102, according to an embodiment.

According to an embodiment, the physical coupling mechanism 118 is configured to couple the event marking device 102 to an object external to the event marking device 102. The physical coupling mechanism 118 may be configured to couple the event marking device 102 to a user. The physical coupling mechanism 118 may be configured to couple the event marking device 102 to the wrist of the user, the finger of the user, an article of clothing of the user, or to otherwise couple the event marking device 102 to the user. The physical coupling mechanism 118 may also be configured to couple the event marking device 102 to an external device or structure other than the user. The physical coupling mechanism 118 may be configured to couple the event marking device 102 to a piece of sporting equipment, to a vehicle, to an electronic device, or to other objects.

Figure 2:
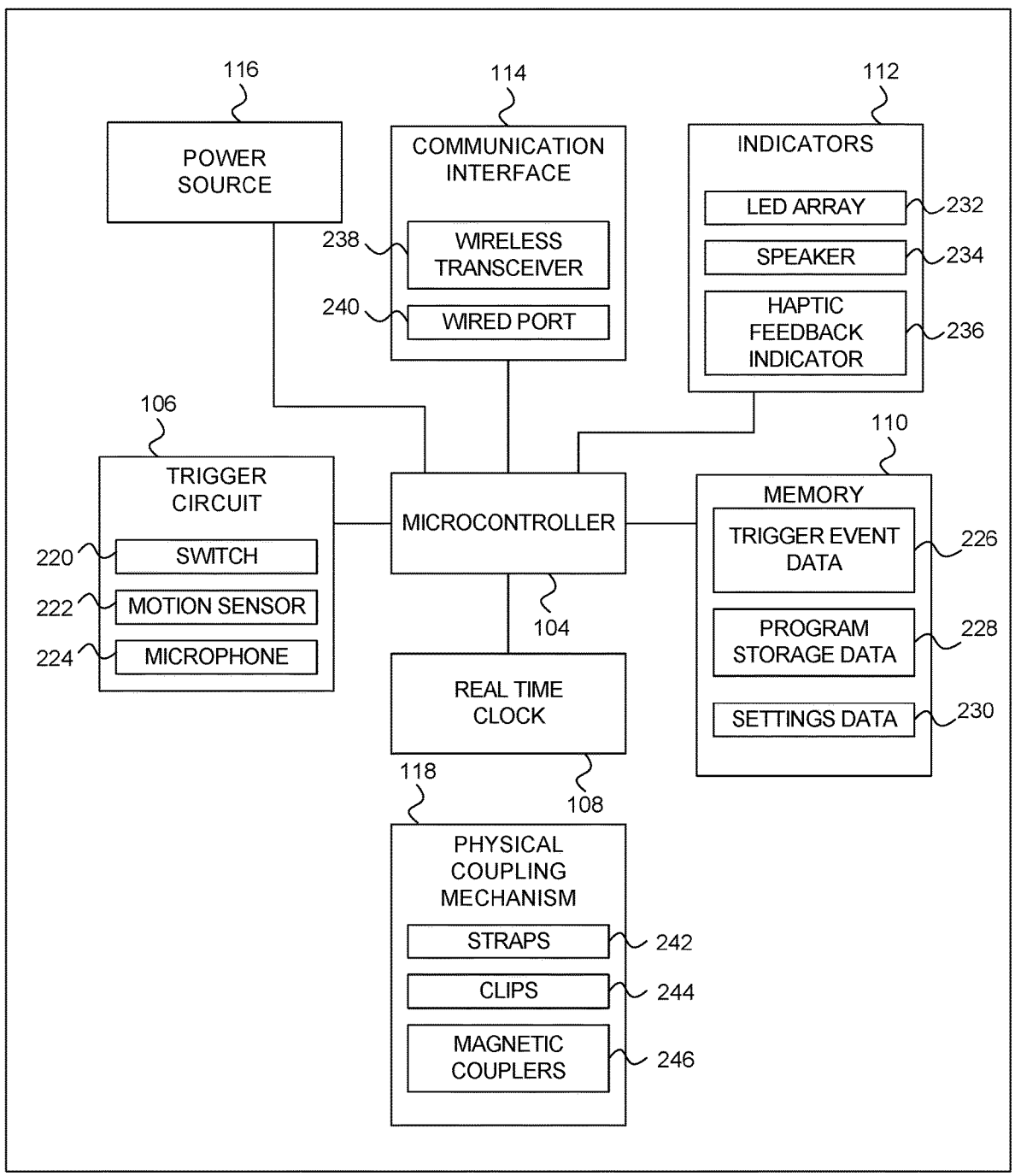
FIG. 2 is a block diagram of an event marking device, according to an embodiment.

FIG. 2 is a block diagram of an event marking device 102, according to an embodiment. The event marking device 102 includes a microcontroller 104, a trigger circuit 106, a real-time clock 108, a memory 110, indicators 112, a communication interface 114, and a power source 116. The components of the event marking device 102 cooperate to provide efficient and convenient real-time marking of notable events.

According to an embodiment, the trigger circuit 106 includes a switch 220 configured to enable a user of the event marking device 102 to provide input to the trigger circuit 106 in order to cause the trigger circuit 106 to generate a trigger signal. According to an embodiment, when a notable event occurs, the user of the event marking device 102 may operate the switch 220 in order to cause the trigger circuit 106 to generate a trigger signal. The switch 220 may include a button. When the user notices an event that the user would like to mark, the user may press the button, thereby causing the trigger circuit 106 to generate a trigger signal. The switch 220 may include a slider mechanism that the user can slide in order to cause the trigger circuit 106 to generate a trigger signal. The switch 220 may include other kinds of mechanisms that a user can operate to cause the trigger circuit 106 to generate a trigger signal.

According to an embodiment, the trigger circuit 106 may include a motion sensor 222. The motion sensor 222 senses the motion of the event marking device 102. If the motion sensor 222 senses a particular kind of motion, in accordance with previously defined parameters, the trigger circuit 106 generates a trigger signal. The kinds of motion that can cause the trigger circuit 106 to generate a trigger signal may include certain kinds of acceleration, certain kinds of angular motion, certain orientations of the event marking device 102, and/or other kinds of motions or orientations. Accordingly, the motion sensor 222 may include one or more accelerometers and/or one or more gyroscopes. The one or more accelerometers may sense acceleration of the event marking device 102. The one or more gyroscopes may sense turning of the event marking device 102.

According to an embodiment, the event marking device 102 is coupled to a mountain bike, or to a person riding a mountain bike. The rider of the mountain bike may be recording a ride with a video camera. The trigger circuit 106 includes a motion sensor 222. Trigger circuit 106 is configured to generate a trigger signal when the motion sensor 222 senses certain kinds of motion. For example, the trigger circuit 106 may be configured to generate a trigger signal when the motion sensor 222 senses motion corresponding to a crash, when the motion sensor 222 senses motion corresponding to a large jump, when the motion sensor 222 senses motion corresponding to a flip or sudden rotation of the mountain bike, when the motion sensor 222 senses steep downhill orientation, when the motion sensor 222 senses a high rate of speed, when the motion sensor 222 senses motion or orientation indicating a steep uphill, or when the motion sensor 222 senses other kinds of motions that indicate that a notable event has occurred that the user may wish to be able to quickly identify in the recorded video. The user may be in a situation in which it is not convenient for the user to operate the switch 220 because the user must concentrate fully on operating the mountain bike. Advantageously, the trigger circuit 106 utilizing the motion sensor 222 may generate a trigger signal automatically when certain kinds of motion are sensed. A trigger circuit 106 utilizing the motion sensor 222 may be useful in many kinds of situations other than the specific situation of a user operating a mountain bike.

According to an embodiment, the trigger circuit 106 includes a microphone 224. The microphone 224 is configured to detect sound. Alternatively, the trigger circuit 106 may not include a microphone 224, but may instead receive signals from the microphone 224. The trigger circuit 106 and the microphone 224 may operate to enable the trigger circuit 106 to generate trigger signals based on sounds detected by the microphone 224. This may be very helpful in situations in which the user is not able to manually operate the switch 220 in order to cause the trigger circuit 106 to generate the trigger signal.

According to an embodiment, the trigger circuit 106 may include voice processing circuitry and software that enables the event marking device 102 to receive, via the microphone 224, and understand audible commands from the user in order to generate trigger signals. For example, the trigger circuit 106 may be configured to detect certain words spoken by a user that indicate that the trigger circuit 106 should generate a trigger signal. When the user speaks the appropriate command, the trigger circuit 106, together with the microphone 224 and any other signal processing circuitry or software, senses that the user has spoken the command and generates a trigger signal. The microcontroller 104 receives the trigger signal, reads the real time from the real-time clock 108, and writes trigger event data 226 to the memory 110.

According to an embodiment, the trigger circuit 106 may utilize the microphone 224 to generate trigger signals even when the user has not specifically provided an audible command to generate trigger signals. The trigger circuit 106, together with the microphone 224 and any other sound processing circuitry and software, may detect certain kinds of sound that indicate that a notable event has occurred and responsively generate a trigger signal. For example, notable events may be accompanied by loud exclamations from participants or bystanders. These exclamations may or may not include spoken words. Often notable events are accompanied by shouts or yelling. The trigger circuit 106, together with the microphone 224, may detect such exclamations and responsively generate a trigger signal. Additionally or alternatively, the trigger circuit 106 may be configured to generate a trigger signal when sounds received by the microphone 224 indicate an accident, when sounds exceed a certain decibel level, when sounds indicate cheering, when sounds indicate high distress, when sounds indicate possible violence, and/or other situations. Thus, the trigger circuit 106 including the microphone 224 may generate trigger signals based on sounds other than intentional audible commands. The microcontroller 104 may receive the trigger signals, read the real-time clock 108, and write trigger event data 226 to the memory 110.

According to an embodiment, the memory 110 stores data related to the function of the event marking device 102. The memory 110 may include trigger event data 226 written to the memory 110 at the direction of the microcontroller 104 and corresponding to real times at which trigger signals were received from the trigger circuit 106 and in accordance with the real-time clock 108. The memory 110 may include program storage data 228. The program storage data 228 may correspond to software instructions that control the functionality of the various components of the event marking device 102. The memory 110 may include settings data 230. The settings data 230 may include settings selected or adjusted by users of the event marking device 102. The settings data 230 includes settings related to the generation of trigger signals, settings related to the real-time clock 108, settings related to the indicators 112, settings related to the communication interface 114, settings related to the microcontroller 104, or other kinds of settings. The settings data 230 may also include settings generated by the microcontroller 104 or settings that were preset by the manufacturer. The memory 110 may also include other kinds of data related to the operation of the event marking device 102, as will be apparent to those of skill in the art in light of the present disclosure.

According to an embodiment, the indicators 112 include an LED array 232. The LED array 232 may include one or more LEDs. Illumination of the LEDs may provide indications to the user related to the operation of the event marking device 102. The LED array 232 may be illuminated in the way to indicate that the event marking device 102 is in a state of readiness to accept trigger circuit 106 enablement from the user. The LED array 232 may be illuminated in a way to indicate that the trigger circuit 106 was recently enabled. The LED array 232 may be illuminated in a way to indicate that the event marking device 102 is powered on. The LED array 232 may be illuminated in a way to indicate a state of charge of the power source 116. Additionally or alternatively, the LED array 232 may include various illumination patterns to indicate various states of operation of the event marking device 102. For example, a counterclockwise sequence of illumination may provide a type of indication, a clockwise sequence of illumination may provide a different type of indication. Similarly, a leftward or rightward LED sequence may provide respective types of indication, the colors of LEDs that are illuminated may provide respective types of indication, and/or solid versus blinking LEDs may provide respective types of indication.

According to an embodiment, the indicators 112 include a speaker 234. The speaker 234 may be configured to output sounds that can be heard by a user in order to indicate to the user various states of operation of the event marking device 102. The speaker 234 may output audible words indicating to the user various states of operation of the event marking device 102. Additionally or alternatively, the speaker 234 may output sounds that are not words. The sounds may indicate that the event marking device 102 has been turned on. The sounds may indicate that the event marking device 102 has generated a trigger signal. The sounds may indicate that the event marking device 102 is in a state of readiness to receive input from the user and/or to generate trigger signals. The sounds may indicate that the power source 116 is depleted.

According to an embodiment, the indicators 112 may include a haptic feedback indicator 236. The feedback indicator 236 is configured to provide feedback to the user. The haptic feedback indicator 236 is configured to provide indications to the user related to operation of the event marking device 102. For example, the haptic feedback indicator 236 may be configured to provide haptic feedback in the form of vibrations. The vibrations may indicate to the user that a trigger signal has just been generated, that the event marking device 102 has been turned on, that the event marking device 102 is in a state of readiness to receive input from the user and/or to generate trigger signals, or that the power source 116 is depleted. The haptic feedback indicator 236 may also provide other types of indications than those set forth above.

According to an embodiment, the communication interface 114 includes a wireless transceiver 238 including a radio interface configured to enable the event marking device 102 to communicate wirelessly with external electronic devices. The microcontroller 104 may cause the communication interface 114 to output trigger event data 226 from the memory 110 to an external electronic device. The communication interface 114 may also receive wireless data from the external electronic device. The wireless data may include requests for trigger event data 226, instructions to adjust the settings data 230 stored in the memory 110, software updates for the program storage data 228, or other types of data.

According to an embodiment, the wireless transceiver 238 is an RF transceiver. According to an embodiment, the wireless receiver 238 implements a Bluetooth protocol. According to an embodiment, the wireless transceiver 238 implements a Zigbee protocol. According to an embodiment, the wireless transceiver 238 implements a Wi-Fi protocol. The wireless transceiver 238 may operate in accordance with other protocols. The wireless transceiver 238 may be a wireless transceiver other than an RF transceiver.

According to an embodiment, the communication interface 114 includes a wired port 240 configured to enable the event marking device 102 to couple with an external device with a wired connection in order to communicate with external electronic devices. The microcontroller 104 may cause the communication interface 114 to output trigger event data 226 from the memory 110 to an external electronic device via the wired port 240. The communication interface 114 may also receive data from the external electronic device. The data may include requests for trigger event data 226, instructions to adjust the settings data 230 stored in the memory 110, software updates for the program storage data 228, or other types of data.

According to an embodiment, the physical coupling mechanism 118 is configured to couple the event marking device 102 to an external object, structure, or individual. According to an embodiment, the physical coupling mechanism 118 may include one or more straps 242. The straps 242 may be wrapped around the portion of an external object, structure, device, or individual in order to fix the event marking device 102 to the external object, structure, device, or individual. The straps 242 may include Velcro, adjusters, buckles, or other functionality to enable fixing the event marking device 102 to the external object, structure, device, or individual.

According to an embodiment, the physical coupling mechanism 118 may include clips 244. The clips 244 may enable clipping the event marking device 102 to an external object, structure, device or individual in order to fix the event marking device 102 to the external object, structure, device, or individual.

According to an embodiment, the physical coupling mechanism 118 may include magnetic couplers 246. The magnetic couplers 246 may enable the event marking device 102 to be magnetically coupled to an external object, structure, device, or individual. The magnetic couplers 246 may include magnets that interact with corresponding magnetic structure in the external object, structure, device, or individual. The physical coupling mechanism 118 may include other kinds of physical coupling devices, as will be apparent to those of skill in the art in light of the present disclosure.

According to an embodiment, the microphone 224 is operatively coupled to the memory 110, and configured to continuously output audio data to a cache portion of the memory 110. For example, the memory 110 may include a cache portion sufficient to store some amount of audio data. When the cache is full, the oldest audio data is deleted and new audio data is written to the cache. When the trigger signal is received from the trigger circuit 106, the microcontroller 104 is configured to preserve at least a portion of the audio data in the cache portion of the memory 110 extending from a point before generation of the trigger signal each time that the trigger signal is received. When the trigger signal is received, the microcontroller 104 may cause the audio data currently in the cache to be transferred to a portion of the memory 110.

According to an embodiment, the microcontroller 104 is configured to read each preserved portion of the audio data from the memory 110 and output each preserved portion of the audio data via the communication interface 114 when the communication interface 114 is operatively coupled to an external device.

Figure 3:
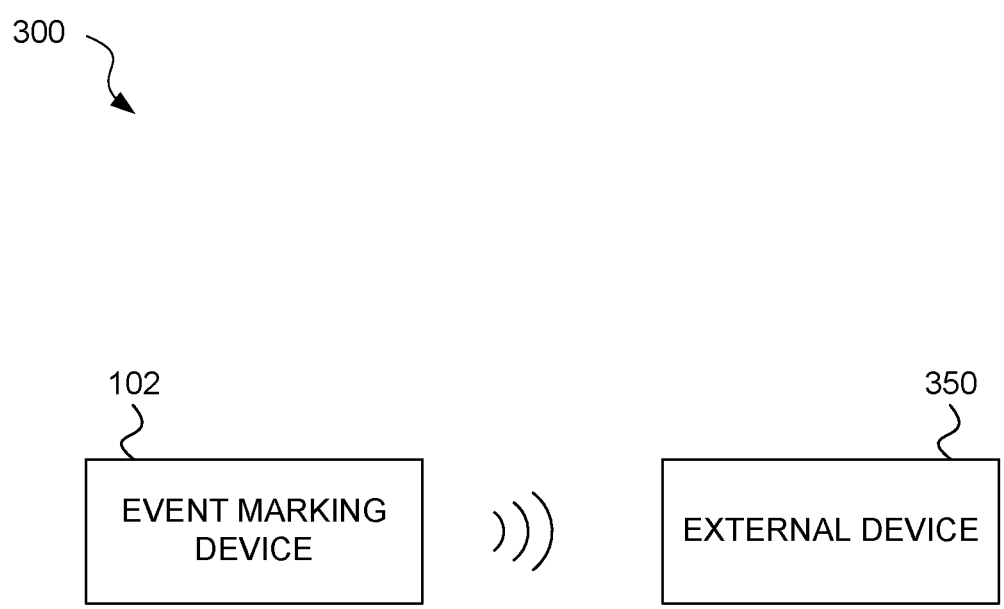
FIG. 3 is a block diagram of an event marking system, according to an embodiment.

FIG. 3 is a block diagram of an event marking system 300, according to an embodiment. The event marking system 300 includes an event marking device 102 and an external device 350. The event marking device 102 is configured to wirelessly output the trigger event data to the external device 350. Additionally or alternatively, the event marking device 102 may be configured to output the trigger event data to the external device 350 via a wired connection.

According to an embodiment, the external device 350 is a media capture device 350, such as a video camera. The media capture device 350 is configured to capture media, such as video and/or audio. The media capture device 350 may be configured to continuously store captured media in a temporary storage. As the temporary storage becomes full, the oldest captured media is replaced with the newest captured media. If the temporary storage includes enough storage to store two minutes of captured media, then the temporary storage always includes the most recent two minutes of captured media, unless the media capture device 350 has been capturing media for less than two minutes. When the media capture device 350 receives trigger event data from the event marking device 102, the external device 350 transfers the capture media from the temporary storage into a permanent storage. This has the effect that the media capture device 350 retrospectively captures media from a period of time before the trigger event data was received. The media capture device 350 may then continue to capture media and store it in the permanent storage until subsequence trigger event data is received from the event marking device 102 indicating that the external device 350 may revert to capturing media to the temporary storage until the trigger signal is again received. Further details related to a media capture device configured to retrospectively capture media can be found in U.S. Pat. No. 8,942,533, titled "RECORDER WITH RETROSPECTIVE CAPTURE", filed Sep. 4, 2009. U.S. Pat. No. 8,942,533, to the extent that it is not inconsistent with the present disclosure, is incorporated herein by reference.

According to an embodiment, the event marking device 102 and the media capture device 350 are in communication with each other while the media capture device 350 is actively capturing media. When the microcontroller 104 writes the trigger event data to the memory 110, the microcontroller 104 may cause the communication interface 114 to output the trigger event data 226 to the media capture device 350. The media capture device 350 may utilize the trigger event data 226 in order to flag or mark a portion of the captured media corresponding to the real-time at which the trigger event was generated. When the user subsequently accesses the captured media, the captured media may include a highlight, flag, or marking to indicate those portions of the captured media that correspond to real times at which trigger events were generated. This enables the user to quickly and easily view or access those portions of the captured media that correspond to notable events that occurred during recording. Additionally or alternatively, when the user exports video data from the media capture device 350 to a personal computing device, the video data may include flags to indicate the locations of the video recording that corresponds to the generation of the trigger events. Additionally or alternatively, the media capture device 350 may generate separate media files for those portions of the captured media that correspond to trigger events.

In one embodiment, the trigger circuit 106 may include multiple switches 220. A first switch 220 may cause the generation of trigger event data 226 that indicates that the video recording device 350 should retrospectively capture a portion of the video stream that occurred before generation of the trigger signal. A second switch 220 may cause the generation of trigger event data 226 that indicates to the media capture device 350 should only permanently capture or flag video stream subsequent to the generation of the trigger signal.

In one embodiment, the event marking device 102 may act as a remote control for the media capture device 350. The event marking device 102 may receive trigger input from the user and may generate trigger event data, or other control signals, causing the media capture device 350 to begin capturing media data, to retrospectively capture media data, to cause the capture media data, stop the capturing of media data, to turn off the media capture device 350, or to control other functions of the media capture device 350. This way, the event marking device 102 may act as a remote control to control the media capture device 350.

In one embodiment, the external device 350 is a server or cloud-based media editing system 350. The event marking device 102 may be configured to output the trigger event data 226 to the server or cloud-based media editing system 350. The server or cloud-based media editing system 350 may then utilize the trigger event data to assist in editing media captured by a media capture device 350.

In one embodiment, the external device 350 is a personal electronic device 350 of the user of the event marking device 102. The personal electronic device 350 may include a mobile phone, a laptop computer, a tablet, a desktop computer, or another kind of personal electronic device 350. The event marking device 102 may be configured to output the trigger event data 226 to the personal electronic device 350.

Figure 4A:
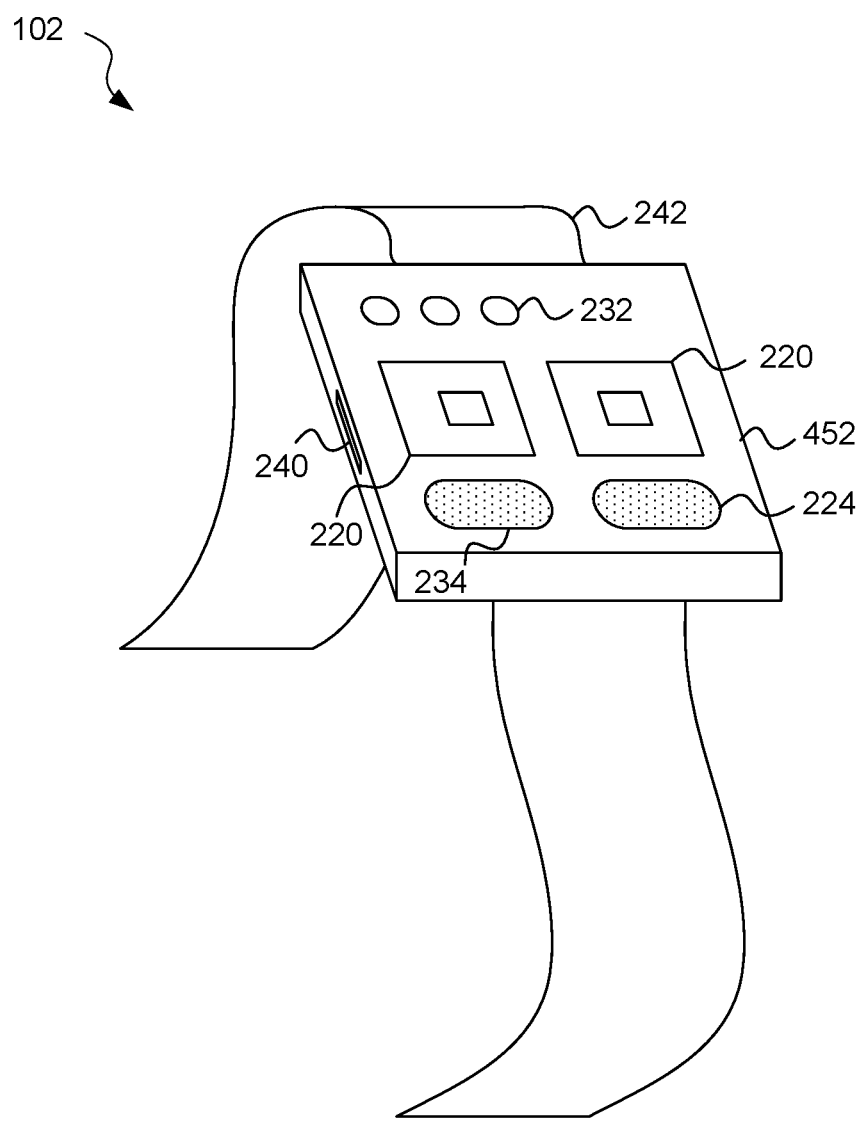
FIG. 4A is an illustration of an event marking device, according to an embodiment.

FIG. 4A is an illustration of an event marking device 102, according to an embodiment. The event marking device 102 includes a housing 452. The housing 452 houses the microcontroller 104, the trigger circuit 106, the real-time clock 108, the memory 110, the communications interface 114, and the power source 116. The housing 452 may also house other components or portions of other components of the event marking device 102. The event marking device 102 includes straps 242 for coupling the event marking device 102 to an external object, structure, individual, or device. The event marking device 102 includes a microphone 224 for receiving sounds. The event marking device 102 includes a speaker 234 for outputting sounds. The event marking device 102 includes switches 220 configured to be operated by the user in order to cause the trigger circuit 106 generated trigger signals. The event marking device 102 includes a wired port 240. The wired port 240 is configured to receive a communication cable and/or a charging cable in order to enable the event marking device 102 to communicate with an external device and/or to receive power to the event marking device 102, either for powering the device or for charging a battery of the event marking device 102. The event marking device 102 includes an LED array 232 for providing indications to the user of various operational states of the event marking device 102. The event marking device 102 may also include a display for displaying images or text to the user.

Those of skill in the art will understand, in light of the present disclosure, that the event marking device 102 may include different structures, different shapes, and different components than those shown in FIG. 4A. All such other structures, shapes, and components fall within the scope of the present disclosure.

Figure 4B:
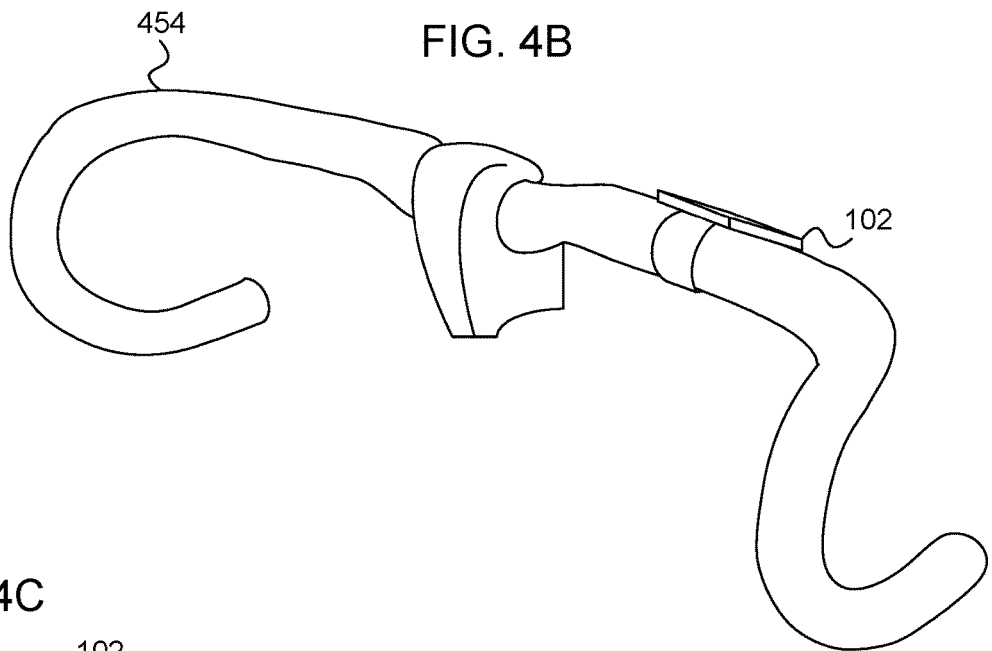
FIGS. 4B-4D illustrate event marking devices disposed in various scenarios, according to embodiment.

FIG. 4B is an illustration of an event marking device 102 coupled to the handlebars 454 of a bicycle, according to an embodiment. As a user rides the bicycle, the event marking device 102 may be utilized to mark notable events that occurred during the bike ride. The user may operate the event marking device 102 to generate trigger signals during the bike ride. Additionally or alternatively, the event marking device 102 automatically generate trigger signals in certain circumstances. The trigger signals correspond to times at which notable events occurred during the bike ride. If the user is also wearing a camera to record a video stream of the bike ride, then the trigger event data 226 written to the memory 110 of the event marking device 102 can be utilized in order to efficiently retrieve those portions of the video stream that correspond to the notable events marked by the event marking device 102.

Figure 4C:
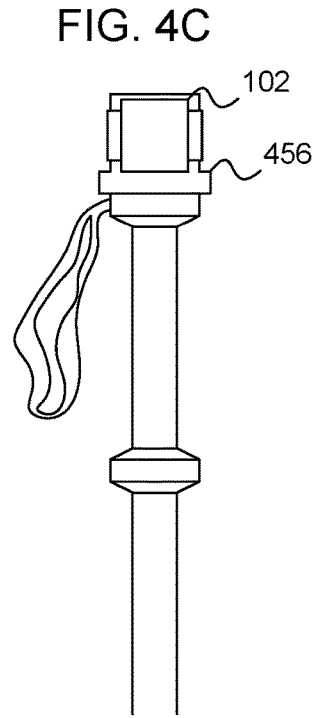

FIG. 4C is an illustration of an event marking device 102 coupled to a ski pole 456, according to an embodiment. As a user skis with the ski poles 456, the event marking device 102 may be utilized to mark notable events that occurred during the skiing. The user may operate the event marking device 102 to generate trigger signals during the skiing. Additionally or alternatively, the event marking device 102 may automatically generate trigger signals in certain circumstances. The trigger signals correspond to times at which notable events occurred during the skiing. If the user is also wearing a camera to record a video stream of the skiing, then the trigger event data 226 written to the memory 110 of the event marking device 102 may be utilized in order to efficiently retrieve those portions of the video stream that correspond to the notable events marked by the event marking device 102 during the skiing.

Figure 4D:
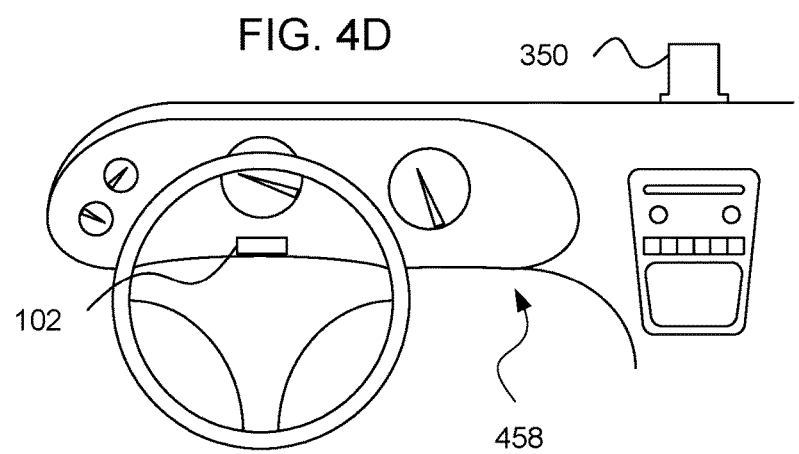

FIG. 4D is an illustration of an event marking device 102 coupled to the dash 458 of a car, according to an embodiment. As the user or another individual drives, the event marking device 102 may be utilized to mark notable events that occur during the drive. The user may operate the event marking device 102 to generate trigger signals during the drive. Additionally or alternatively, the event marking device 102 may automatically generate trigger signals in certain circumstances. The trigger signals correspond to times at which notable events occurred during the drive.

According to an embodiment, an external device 350, such as a media capture device 350, is positioned on the dash of the car in order to capture media. The user may utilize the event marking device 102 to generate trigger event data to cause the media capture device 350 to retrospectively capture media during the drive. Additionally or alternatively, the trigger event data 226 written to the memory 110 of the event marking device 102 may be utilized in order to efficiently retrieve those portions of captured media that correspond to the notable events marked by the event marking device 102 during the drive.

Figure 5:
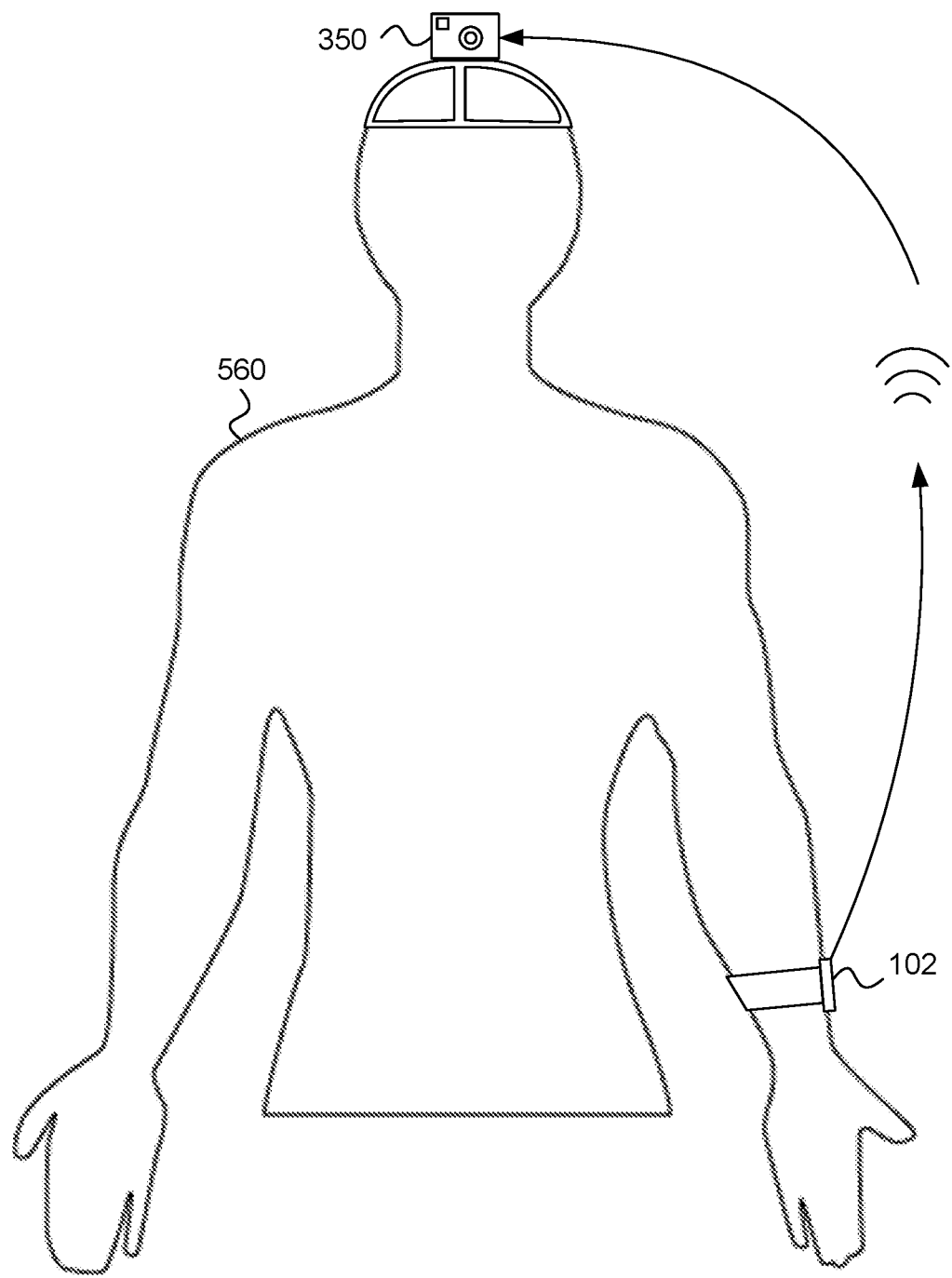
FIG. 5 is an illustration of an event marking system, according to an embodiment.

FIG. 5 is an illustration of a user 560 wearing an event marking device 102 and an external device 350. The external device 350 is a head mounted video camera 350, according to an embodiment. The event marking device 102 may generate trigger signals and may mark the real time at which the trigger signals are generated. The trigger signals correspond to the real times at which notable events occurred while the user 560 was wearing the head mounted video camera 350. In the example of FIG. 5, the user 560 is wearing the event marking device 102 on the wrist like a watch. The event marking device 102 may be a watch including a display that displays the real time. The user 560 may manually operate switches 220 to cause a trigger circuit 106 to generate trigger signals. The event marking device 102 may also automatically generate trigger signals under certain circumstances. According to an embodiment, the event marking device 102 may communicate wirelessly with the head mounted video camera 350. The event marking device 102 may output trigger event data 226 to the head mounted video camera 350. The head mounted video camera 350 may receive the trigger event data 226 and may mark the video stream to indicate at what point notable events occurred in the video stream. The event marking device 102 may also output trigger event data 226 that causes the head mounted video camera 350 to retrospectively capture video corresponding to a notable event. The event marking device 102 may also operate as a remote control for the head mounted video camera 350. The user may operate the event marking device 102 in order to cause the event marking device 102 to control the function of the head mounted video camera 350.

Figure 6:
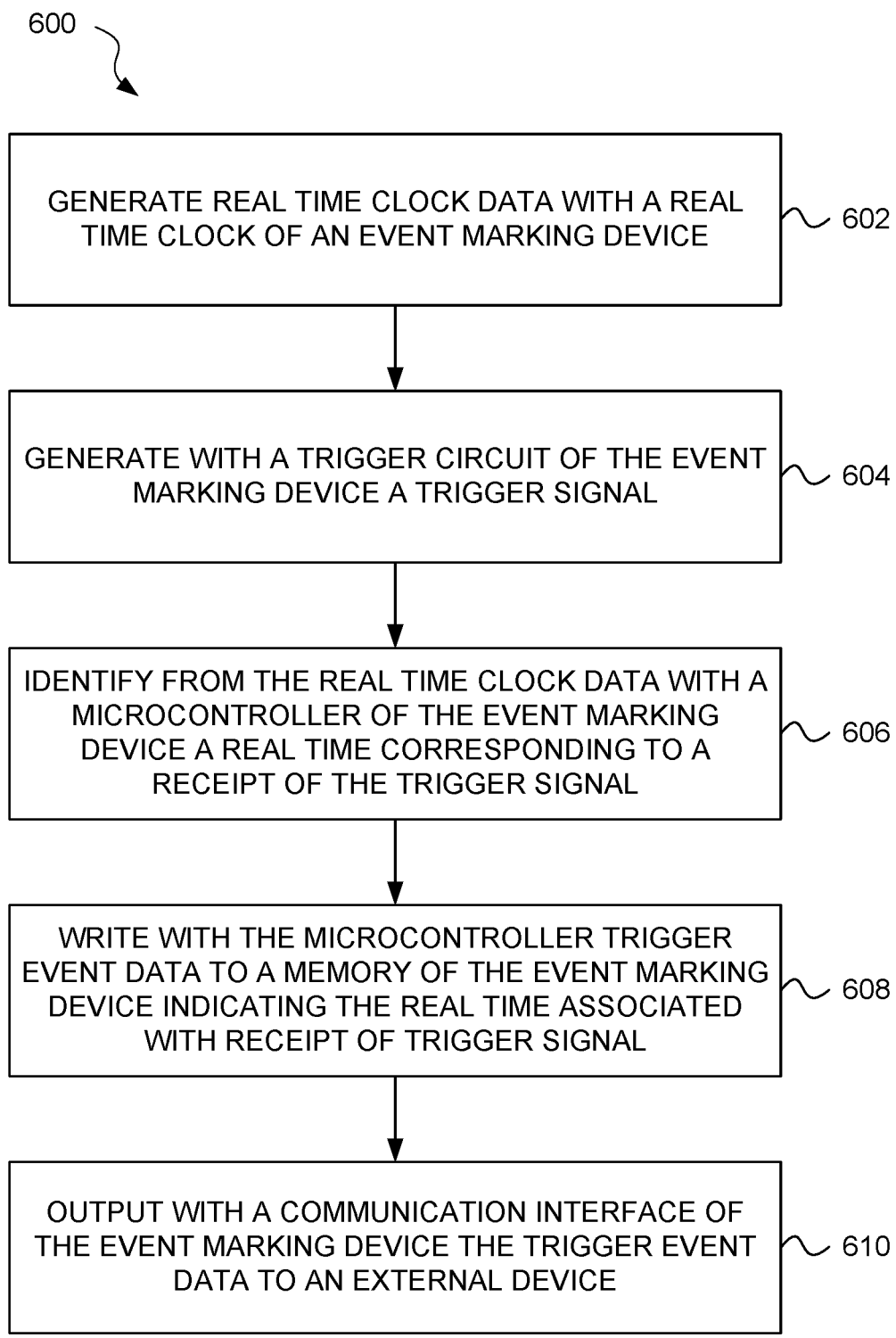
FIG. 6 is a flow diagram of a process for operating an event marking device, according to an embodiment.

FIG. 6 is flow diagram of a process 600 for operating an event marking device 102, according to an embodiment. At 602, the event marking device 102 generates real-time clock data with the real-time clock 108. At 604, a trigger circuit 106 of the event marking device 102 generates a trigger signal. At 606, a microcontroller 104 of the event marking device 102 identifies from the real-time clock data a real time corresponding to a receipt of the trigger signal. At 608, the microcontroller 104 writes trigger event data 226 to a memory 110 of the event marking device 102 indicating the real time associated with receipt of the trigger signal. At 610, a communication interface 114 of the event marking device 102 outputs the trigger event data 226 to an external device 350.

According to an embodiment, the method includes generating the trigger signal based on input received from the user.

According to an embodiment, the method includes generating the trigger signal without input from the user.

According to an embodiment, the method includes generating the trigger signal in response to receiving audible sounds via a microphone 224 of the event marking device 102. According to an embodiment, the method includes performing voice processing on the audible sounds.

According to an embodiment, the method includes identifying spoken words in the audible sounds and generating the trigger signal based on the spoken words.

According to an embodiment, the method includes generating the trigger signal based on a tone of the audible sounds.

According to an embodiment, the method includes generating the trigger signal based on an amplitude of the audible sounds.

According to an embodiment, the method includes sensing a motion of the event marking device 102 and generating the trigger signal based on the motion.

According to an embodiment, the method includes generating the trigger signal in response to manipulation of a switch 220 by the user.

According to an embodiment, the method includes outputting the trigger event data wirelessly to the external device 350.

According to an embodiment, the method includes outputting the trigger event data to the external device 350 via a wired connection.

According to an embodiment, the method includes fixing the event marking device 102 to an article of athletic equipment.

According to an embodiment, the method includes fixing the event marking device 102 to a vehicle.

According to an embodiment, the method includes fixing the event marking device 102 to the user.

According to an embodiment, the method includes fixing the event marking device 102 to an article of clothing of the user.

According to an embodiment, the method includes fixing the event marking device 102 to a wrist of the user.

According to an embodiment, the external device 350 is a video camera.

According to an embodiment, the trigger event data indicates that the video camera should flag a portion of a video stream corresponding to the real time at which the trigger signal was generated.

According to an embodiment, the trigger event data indicates that the video camera should permanently capture a portion of a video stream that occurred prior to the real time at which the trigger signal was generated.

According to an embodiment, the trigger event data indicates that the video camera should permanently capture a portion of a video stream that occurred after the real time at which the trigger signal was generated.

According to an embodiment, the method includes controlling a function of the video camera with the event marking device 102.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. An event marking device, comprising:
    a housing;
    a microcontroller disposed in the housing;
    a memory disposed in the housing and operatively coupled to the microcontroller;
    a real-time clock disposed in the housing and operatively coupled to the microcontroller;
    a communication interface disposed in the housing and operatively to the microcontroller; and
    a trigger circuit disposed in the housing, operatively coupled to the microcontroller, and arranged to be enabled by a user to identify an event for recording;
    wherein the microcontroller is configured to read the real-time clock and write a corresponding real-time datum in the memory upon receiving enablement of the trigger circuit by the user; and
    wherein the microcontroller is configured to read the real-time data from the memory and output the real-time datum via the communication interface when the communication interface is operatively coupled to an external device;
    whereby the real-time datum causes the external device to preserve a recording captured at the time of the enablement of the trigger circuit.

2. The event marking device of claim 1, further comprising:
    a microphone circuit disposed in the housing, operatively coupled to the memory, and configured to continuously output audio data to a cache portion of the memory;
    wherein the microcontroller is configured to preserve at least a portion of the audio data in the cache portion of the memory extending from a point before receipt of the trigger circuit enablement by the user.

3. The event marking device of claim 2, wherein the microcontroller is configured to read each preserved portion of the audio data from the memory and output each preserved portion of the audio data via the communication interface when the communication interface is operatively coupled to the external device.

4. The event marking device of claim 1, wherein the housing is configured to be carried by the user.

5. The event marking device of claim 1, wherein the housing is configured to be worn by the user.

6. The event marking device of claim 1, further comprising a visible indicator operatively coupled to the microcontroller, the visible indicator capable of being energized to indicate readiness to accept trigger circuit enablement.

7. The event marking device of claim 1, further comprising a haptic indicator to provide indications to the user via haptic feedback.

8. A method, comprising:
    generating real-time clock data with a real-time clock of an event marking device;
    generating, with a trigger circuit of the event marking device, a trigger signal;
    identifying, from the real-time clock data with a microcontroller of the event marking device, a real time corresponding to a receipt of the trigger signal;
    writing, with the microcontroller, trigger signal data to a memory of the event marking device indicating the real time associated with receipt of the trigger signal; and
    outputting, with a communication interface of the event marking device, the trigger event data including the time of generating the trigger signal to an external device;
    whereby outputting the trigger event data causes the external device to preserve a recording captured at the time of the enablement of the trigger circuit.

9. The method of claim 8, wherein generating the trigger signal includes generating the trigger signal based on input received from a user.

10. The method of claim 9, further comprising generating the trigger signal in response to receiving audible sounds via a microphone of the event marking device.

11. The method of claim 10, further comprising performing voice processing of the audible sounds.

12. The method of claim 11, further comprising identifying spoken words in the audible sounds and generating the trigger signal based on the spoken words.

13. The method of claim 8, further comprising sensing a motion of the event marking device and generating the trigger signal based on the motion.

14. The method of claim 8, further comprising generating the trigger signal in response to manipulation of a switch by a user.

15. A device, comprising:
   a trigger circuit disposed in a housing and configured to generate a trigger signal;
   a real-time clock disposed in the housing and configured to generate real-time clock data corresponding to a real time;
   a memory disposed in the housing and configured to store data in a computer readable media;
   a microcontroller coupled to the trigger circuit, the real-time clock, and the memory and configured to receive the trigger signal, to reference the real-time clock data upon receiving the trigger signal, and to write trigger event data to the memory indicating a real time at which the trigger signal was generated;
   and
   a communication interface configured to output the trigger event data to an external device;
   whereby the external device is made to store or transmit recorded content corresponding to the real time of the trigger event.

16. The device of claim 15, wherein the trigger circuit includes a switch configured to be operated by the user.

17. The device of claim 15, wherein the housing comprises a housing of a smart watch; and
   wherein the trigger circuit includes an object displayed by a graphical user interface on an electronic display forming a portion of the smart watch.

18. The device of claim 15, wherein the housing comprises a housing of a smart phone; and
   wherein the trigger circuit includes an object displayed by a graphical user interface on an electronic display forming a portion of the smart phone.

* * * * *